United States Patent
Ichikawa

(10) Patent No.: US 10,212,665 B2
(45) Date of Patent: Feb. 19, 2019

(54) MOBILE DEVICE, CONTROL PROGRAM THEREFOR, AND CONTROL METHOD THEREFOR

(71) Applicant: KYOCERA Corporation, Kyoto-shi, Kyoto (JP)

(72) Inventor: Hajime Ichikawa, Tokyo (JP)

(73) Assignee: KYOCERA CORPORATION, Kyoto (JP)

( * ) Notice: Subject to any disclaimer, the term of this patent is extended or adjusted under 35 U.S.C. 154(b) by 189 days.

(21) Appl. No.: 14/891,669

(22) PCT Filed: Jan. 30, 2014

(86) PCT No.: PCT/JP2014/052080
§ 371 (c)(1),
(2) Date: Nov. 16, 2015

(87) PCT Pub. No.: WO2014/185098
PCT Pub. Date: Nov. 20, 2014

(65) Prior Publication Data
US 2016/0088565 A1    Mar. 24, 2016

(30) Foreign Application Priority Data

May 17, 2013 (JP) ................. 2013-105440
May 17, 2013 (JP) ................. 2013-105441

(51) Int. Cl.
*H04W 52/02* (2009.01)
*H04W 84/12* (2009.01)

(52) U.S. Cl.
CPC .... *H04W 52/0254* (2013.01); *H04M 2250/12* (2013.01); *H04W 84/12* (2013.01);
(Continued)

(58) Field of Classification Search
None
See application file for complete search history.

(56) References Cited

U.S. PATENT DOCUMENTS

2007/0184835 A1  8/2007  Bitran et al.
2011/0190038 A1  8/2011  Nakano
(Continued)

FOREIGN PATENT DOCUMENTS

JP    2005-151339 A    6/2005
JP    2009-303234 A   12/2009
(Continued)

OTHER PUBLICATIONS

International Search Report dated Apr. 1, 2014, corresponding to International application No. PCT/JP2014/052080.
(Continued)

*Primary Examiner* — Zhiyu Lu
(74) *Attorney, Agent, or Firm* — Hauptman Ham, LLP

(57) ABSTRACT

A mobile phone includes an acceleration sensor, a communication unit, and a controller. The acceleration sensor detects an acceleration value. The communication unit performs communication. When determining, based on the acceleration value detected by the acceleration sensor, that the mobile device has shifted from a moving state to a stop state, a controller turns off a power supply of the communication unit when a communication connection between the communication unit and a base station is not established and the controller does not turn off the power supply of the communication unit when the communication connection between the communication unit and base station is being established.

6 Claims, 6 Drawing Sheets

(52) U.S. Cl.
CPC .......... *Y02D 70/142* (2018.01); *Y02D 70/144* (2018.01); *Y02D 70/146* (2018.01); *Y02D 70/164* (2018.01); *Y02D 70/166* (2018.01)

(56) References Cited

U.S. PATENT DOCUMENTS

2014/0171053 A1*  6/2014  Stephens .......... H04W 52/0251
                                                455/418
2014/0274041 A1*  9/2014  Lee .................... H04W 48/16
                                                455/434

FOREIGN PATENT DOCUMENTS

| JP | 2011-155465 A | 8/2011 |
| JP | 2011-160147 A | 8/2011 |
| JP | 2011-254158 A | 12/2011 |
| WO | 2012/160673 A1 | 11/2012 |

OTHER PUBLICATIONS

Office Action in JP Application No. 2015-516950, dated Dec. 6, 2016.
Extended European Search Report in EP Application No. 14797701.1, dated Dec. 12, 2016.

* cited by examiner

MOBILE DEVICE, CONTROL PROGRAM THEREFOR, AND CONTROL METHOD THEREFOR

CROSS-REFERENCE TO RELATED APPLICATION

This application is a National Stage of PCT international application Ser. No. PCT/JP2014/052080 filed on Jan. 30, 2014 which designates the United States, incorporated herein by reference, and which is based upon and claims the benefit of priority from Japanese Patent Application No. 2013-105440 filed on May 17, 2013, and the benefit of priority from Japanese Patent Application No. 2013-105441 filed on May 17, 2013, the entire contents of which are incorporated herein by reference.

FIELD

The present disclosure relates to a mobile device, a control program therefor, and a control method therefor.

BACKGROUND

There is known a mobile device that performs communication according to a plurality of communication systems (see, for example, Japanese Patent Application Laid-open No. 2009-303234).

SUMMARY

A mobile device according to an embodiment of the disclosure comprises: an acceleration sensor configured to detect an acceleration value; a communication unit configured to communicate with a base station; and a controller configured to cause a power supply of the communication unit to turn off when a communication connection between the communication unit and the base station is not established upon determining the mobile device has shifted from a stop state to a moving state, and not to cause the power supply of the communication unit to turn off when the communication connection between the communication unit and the base station is being established upon determining the mobile device has shifted from the stop state to the moving state.

A computer program product according to an embodiment of the disclosure comprises: a computer program product having computer instructions, stored on a non-transitory computer readable storage medium, for enabling a computer of a mobile device having an acceleration sensor configured to detect an acceleration value and a communication unit configured to perform communication executing the computer instructions to perform operations comprising: when it is determined, based on the acceleration value detected by the acceleration sensor, that the mobile device has shifted from a stop state to a moving state, turning off a power supply of the communication unit when a communication connection between the communication unit and a base station is not established and not turning off the power supply of the communication unit when the communication connection between the communication unit and the base station is being established.

A control method for a mobile device according to an embodiment of the disclosure comprises: a control method for a mobile device having an acceleration sensor configured to detect an acceleration value and a communication unit configured to perform communication, wherein when it is determined, based on the acceleration value detected by the acceleration sensor, that the mobile device has shifted from a stop state to a moving state, a power supply of the communication unit is turned off when a communication connection between the communication unit and a base station is not established and the power supply of the communication unit is not turned off when the communication connection between the communication unit and the base station is being established.

A mobile device according to an embodiment of the disclosure comprises: an acceleration sensor configured to detect an acceleration value; a communication unit configured to communicate with a base station; and a controller configured to control a power supply state of the communication unit based on a power supply setting, wherein upon determining that the mobile device has shifted from a first acceleration state, through a second acceleration state, to the first acceleration state once again while maintaining the power supply setting in a power supply mode that controls the power supply state of the communication unit according to an acceleration state determined based on the acceleration value, the controller is configured to change the power supply state of the communication unit from a first power supply state to a second power supply state when the mobile device shifts from the first acceleration state to the second acceleration state and the controller is configured to return the power supply state of the communication unit from the second power supply state to the first power supply state when the mobile device shifts from the second acceleration state to the first acceleration state.

A computer program product according to an embodiment of the disclosure comprises: a computer program product having computer instructions, stored on a non-transitory computer readable storage medium, for enabling a computer of a mobile device having an acceleration sensor configured to detect an acceleration value and a communication unit configured to communicate with a base station, and a controller configured to control a power supply state of the communication unit based on a power supply setting executing the computer instructions to perform operations comprising: when it is determined that the mobile device has shifted from a first acceleration state, through a second acceleration state, to the first acceleration state once again while the power supply setting is maintained in a power supply mode that controls the power supply state of the communication unit according to an acceleration state determined based on the acceleration value, changing the power supply state of the communication unit from a first power supply state to a second power supply state when the mobile device shifts from the first acceleration state to the second acceleration state and returning the power supply state of the communication unit from the second power supply state to the first power supply state when the mobile device shifts from the second acceleration state to the first acceleration state.

A control method for a mobile device according to an embodiment of the disclosure comprises: a control method for a mobile device having an acceleration sensor configured to detect an acceleration value, a communication unit configured to communicate with a base station, and a controller configured to control a power supply state of the communication unit based on a power supply setting, wherein when it is determined that the mobile device has shifted from a first acceleration state, through a second acceleration state, to the first acceleration state once again while the power supply setting is maintained in a power supply mode that controls the power supply state of the communication unit according to an acceleration state determined based on the acceleration value, the power supply state of the communication unit is changed from a first power supply state to a second power supply state when the mobile device shifts from the first acceleration state to the second acceleration state and the power supply state of the communication unit is returned from the second power supply state to the first power supply state when the mobile device shifts from the second acceleration state to the first acceleration state.

DESCRIPTION OF EMBODIMENTS

Embodiments of the present disclosure for practicing the present disclosure will be described in detail with reference to the drawings. Hereinafter, a mobile phone 1 will be described as an example of an electronic device.

(An Embodiment 1)

Figure 1:
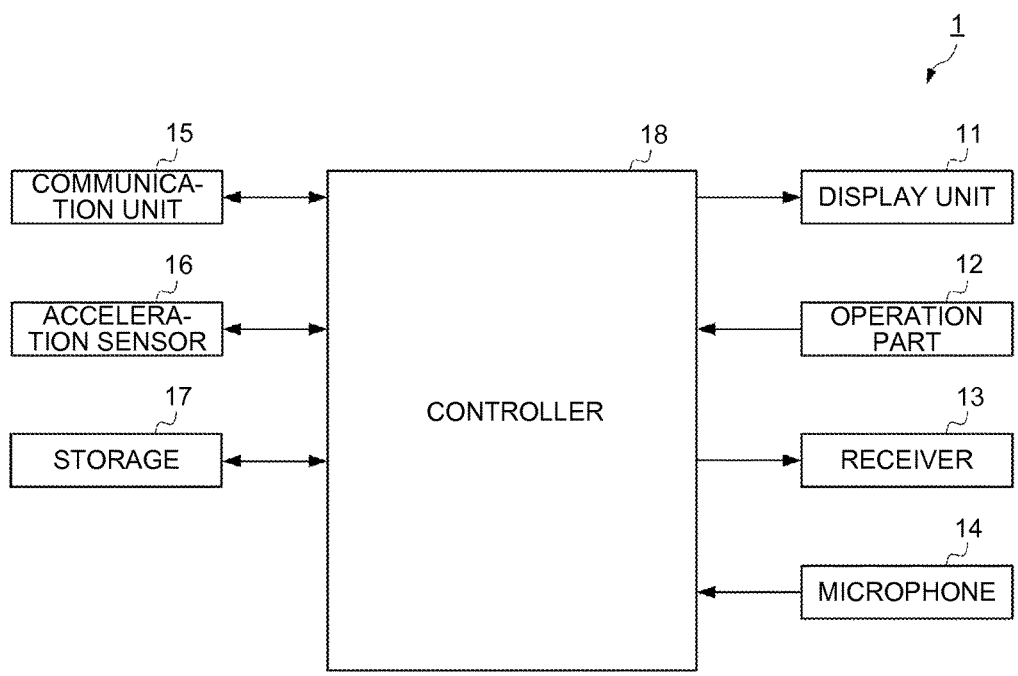
FIG. 1 is a block diagram illustrating a configuration of a mobile phone according to an embodiment of some embodiments.

An Embodiment 1 is one of embodiments. As illustrated in FIG. 1, the mobile phone 1 includes a display unit 11, an operation part 12, a receiver 13, a microphone 14, a communication unit 15, an acceleration sensor 16, a storage 17, and a controller 18.

The display unit 11 is constituted of a display device such as a liquid crystal display or an organic electro-luminescence panel. Characters, images, symbols, graphics, or the like are displayed on the display unit 11.

The operation part 12 includes a plurality of buttons and is operated by a user. The operation part 12 may be constituted of a single button.

The receiver 13 converts a sound signal transmitted from the controller 18 into a sound and outputs the sound.

The communication unit 15 includes an antenna and an RF circuit unit. The communication unit 15 performs communication according to communication schemes supporting a plurality of wireless communication standards, respectively. The communication unit 15 enables communication according to a communication standard for 2G, 3G, and 4G cellular phones or using a wireless LAN system. The communication unit 15 enables communication using a wireless communication system conforming to IEEE 802.11 which is a wireless LAN system, e.g., a Wi-Fi (registered trademark) wireless communication system. The communication unit 15 may perform communication using a WiMAX (registered trademark) wireless communication system. A plurality of the antennas and a plurality of the RF circuit units are provided so as to support a plurality of communication schemes. In an embodiment 1, it is assumed that the communication unit 15 performs communication according to the Wi-Fi standard.

The acceleration sensor 16 detects a direction and a magnitude of an acceleration acting on the mobile phone 1 and outputs a result of the detection to the controller 18. The acceleration sensor 16 is of a 3G (three-dimensional) type that detects acceleration values in X-axis direction, Y-axis direction, and Z-axis direction, respectively.

For example, the acceleration sensor 16 may be, but not limited to, a piezoresistance type or an electrostatic capacitance type. For example, the acceleration sensor 16 may be a piezoelectric element (piezoelectric type), a micro electro mechanical systems (MEMS) type with a heat detection type, a servo type that moves a movable coil and returns it to the original position by a feedback current, or a strain gauge type that measures distortion caused by acceleration using a strain gauge.

The storage 17 is used for arithmetic processing to be performed by the controller 18 and is constituted of, e.g., a memory. The storage 17 stores one or more applications operating inside the mobile phone 1. The storage 17 may serve also as a detachable external memory.

The controller 18 controls the entire mobile phone 1. The controller 18 is constituted of, e.g., a central processing unit (CPU) or a micro-processing unit (MPU).

Detection results of the acceleration sensor 16 are processed by the controller 18 as follows.

Figure 2:
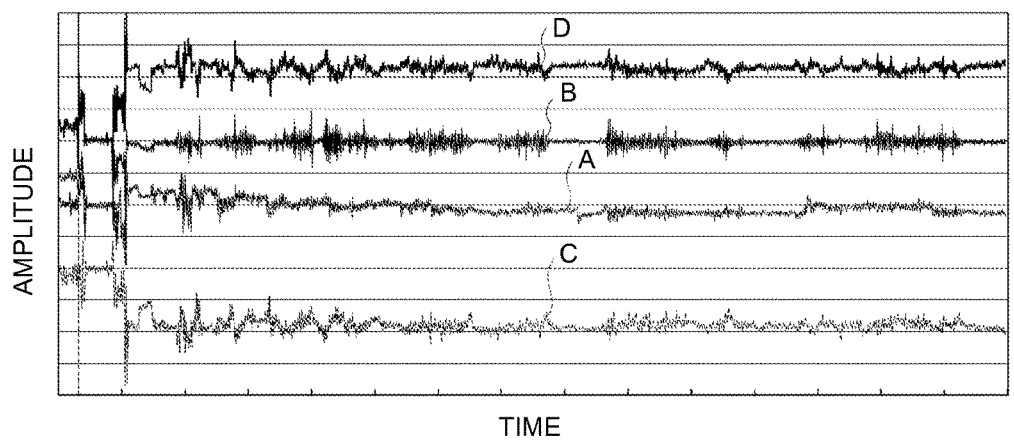
FIG. 2 is an exemplary view illustrating a detection result of an acceleration sensor according to an embodiment of some embodiments.

As illustrated in FIG. 2, the controller 18 receives, as the detection results of the acceleration sensor 16, an acceleration value in an X-axis direction (A in FIG. 2), an acceleration in a Y-axis direction (B in FIG. 2), an acceleration in a Z-axis direction (C in FIG. 2), and a vector value obtained by synthesizing the acceleration values in the X-, Y-, and Z-directions (D in FIG. 2). The controller 18 logs the synthesized vector value. The controller 18 analyzes the logged data to determine a status (acceleration state) of the mobile phone 1. The logged data is stored in the storage 17.

Upon determination of the status of the mobile phone 1, the controller 18 uses acceleration patterns. The acceleration patterns are previously stored in, e.g., the storage 17. The acceleration patterns are associated with a stop state and a plurality of moving states, respectively. The acceleration pattern is a pattern obtained by previously measuring and extracting what kind of acceleration pattern is characteristically detected by the acceleration sensor 16 in a case where the mobile phone 1 is in the stop state, in a case where a user carrying the mobile phone 1 moves by walking, in a case where the user carrying the mobile phone 1 moves on a bicycle, or the like. In an embodiment 1, the acceleration patterns corresponding respectively to the stop state, and a plurality of moving states are previously stored in the storage 17. The acceleration patterns are stored so as to correspond to the logged data of the above-mentioned synthesized vector value. The controller 18 compares the logged data of the synthesized vector value and the acceleration pattern to thereby determine the status of the mobile phone 1.

The controller 18 may determine that the mobile phone 1 is in the stop state when the acceleration value detected by the acceleration sensor 16 is less than a predetermined value, in place of based on the acceleration pattern representing the stop state. The controller 18 may determine that the mobile phone 1 is in the stop state when the logged data of the synthesized vector value does not coincide with any of the plurality of moving states, in place of based on the acceleration pattern representing the stop state.

The mobile phone 1 according to an embodiment 1 has a configuration capable of searching for a suitable base station by determining the status thereof. The following describes the configuration that searches for a suitable base station.

When it is determined, based on the acceleration value detected by the acceleration sensor 16, that the mobile phone 1 has shifted from the moving state to the stop state, the controller 18 controls the communication unit 15 to search for a base station (access point) supporting the Wi-Fi. On the other hand, when it is determined, based on the acceleration value detected by the acceleration sensor 16, that the mobile phone 1 is in the moving state, the controller 18 controls the communication unit 15 not to search for the Wi-Fi base station. A control method that controls the communication unit 15 not to search for the Wi-Fi base station includes a method that performs control so as not to execute a search function and a method that turns off a power supply (power state) of the communication unit 15. The controller 18 has a function of controlling the power supply of the communication unit 15.

Specifically, the controller 18 determines, based on the acceleration value detected by the acceleration sensor 16, whether the mobile phone 1 is in the stop state or one of the plurality of moving states.

For example, the controller 18 determines whether the mobile phone 1 is in the stop state or one of the following first to fifth moving states. The stop state is, e.g., a state where the mobile phone 1 is in a mounted state, or a state where a user of the mobile phone 1 does not move. The controller 18 can determine that the mobile phone 1 is in the stop state when the acceleration value is not detected by the acceleration sensor 16, when the acceleration value detected by the acceleration sensor 16 is less than a predetermined value, or when the logged data of the above synthesized vector value does not coincide with the acceleration pattern representing any of the plurality of moving states.

The controller 18 determines in which one of the following first to fifth moving states the mobile phone 1 is to thereby determine whether the user of the mobile phone 1 moves on a bicycle, an automobile, or an electric train, or moves by walking.

The first moving state is a state where the user of the mobile phone 1 moves without use of a vehicle, that is, the user of the mobile phone 1 is in a walking state. The second moving state is a state where the user moves on an automobile. The third moving state is a state where the user moves on a bicycle. The fourth state is a state where the user moves on an electric train. The fifth state is a state where the user moves by other moving means.

When it is determined that the determined state is one of the first to fifth moving states, the controller 18 controls the communication unit 15 not to search for the Wi-Fi base station. In the moving state, the mobile phone 1 does not search for the Wi-Fi base station, so that power consumption can be reduced as compared to a case where the search is always performed.

The controller 18 can control the power supply of the communication unit 15 when the acceleration value detected by the acceleration sensor 16 satisfies a predetermined condition. When it is determined that the mobile phone 1 has shifted from the stop state to any of the moving states, the controller 18 controls the power supply of the communication unit 15 to turn off the power supply. When the power supply of the communication unit 15 is turned off, the communication unit 15 cannot search for the Wi-Fi base station. In the moving state, the mobile phone 1 turns off the power supply of the communication unit 15, so that power consumption can be reduced as compared to a case where the power supply of the communication unit 15 is always on.

Even when it is determined that the mobile phone 1 has shifted from the stop state to any of the moving states, the controller 18 does not turn off the power supply of the communication unit 15 but maintains an on-state of the power supply when the communication unit 15 has established a communication connection with the base station. Even in the moving state, the mobile phone 1 can continue communication by the communication unit 15.

The controller 18 determines whether or not the status of the mobile phone 1 has shifted. When it is determined that the mobile phone 1 has shifted from the moving state to the stop state, the controller 18 controls the communication unit 15 to search for the Wi-Fi base station.

The controller 18 can control the power supply of the communication unit 15 when the acceleration value detected by the acceleration sensor 16 satisfies a predetermined condition. When it is determined that the mobile phone 1 has shifted from any of the moving states to the stop state, the controller 18 controls the power supply of the communication unit 15 to turn on the power supply. When the power supply of the communication unit 15 is turned on, the communication unit 15 can search for the Wi-Fi base station. The mobile phone 1 turns on the power supply of the communication unit 15 in the stop state, so that power consumption can be reduced as compared to a case where the power supply of the communication unit 15 is always on.

When the Wi-Fi base station has been found, the controller 18 tries to connect communication with the found base station. The mobile phone 1 may be controlled to automatically establish communication connection when the base station that has been found by the search is one that is registered in the storage 17. Further, the mobile phone 1 may be controlled to automatically establish communication connection when the base station that has been found by the search is one with which connection has previously been established. In this case, information of the base station with which connection has previously been established is stored in the storage 17.

The storage 17 stores information for identifying the base station. The information for identifying the base station is, e.g., a service set identifier (SSID). The storage 17 may store an access key used for establishing the communication connection with the stored base station.

The controller 18 of an embodiment 1 repeatedly searches for the base station until the communication connection therewith is established; however, an embodiment 1 is not limited thereto. For example, if there has not been found any Wi-Fi base station within a predetermined time (e.g., one minute), the controller 18 may stop searching for the base station. A control method that controls the communication unit 15 to stop searching for the Wi-Fi base station includes a method that performs control so as not to execute a search function and a method that turns off the power supply of the communication unit 15.

As described above, when the mobile phone 1 has shifted to the stop state where the user can easily perform data communication using the Wi-Fi, it searches for the Wi-Fi base station. Thus, the mobile phone 1 searches for the Wi-Fi base station in the state where the user can easily perform data communication using the Wi-Fi, thereby improving user convenience. Further, the mobile phone 1 searches for the Wi-Fi base station in the state where the user can easily perform data communication using the Wi-Fi, thereby reducing power consumption as compared to a case where the base station is always searched for.

When it is determined that the mobile phone 1 has shifted from the moving state to the stop state, the controller 18 controls the communication unit 15 to search for the Wi-Fi base station. However, an embodiment 1 is not limited thereto, but the controller 18 may control more in detail the communication unit 15 based on in which one of the plurality of moving states the mobile phone 1 is.

That is, the controller 18 may search for the Wi-Fi base station when it is determined, based on the acceleration value detected by the acceleration sensor 16, that the mobile phone 1 has shifted from the walking state to the stop state. The walking state is the first moving state, as described above.

When it is determined, based on the acceleration value detected by the acceleration sensor 16, that the mobile phone 1 has shifted from a getting-on state where the user of the mobile phone 1 gets on the vehicle to the stop state, the controller 18 performs control so as not to search for the Wi-Fi base station. The getting-on state (moving state) is one of the second, third, fourth, and fifth moving states.

When the vehicle on which the user is getting on is stopped, it is highly likely that the vehicle restarts or that the user moves by walking. Thus, in the second to fifth moving states, it is less likely that the user of the mobile phone 1 performs data communication. When the mobile phone 1 has shifted from the getting-on state to the stop state, control is performed so as not to search for the base station, so that the power consumption can be reduced as compared to a case where the base station is searched for every time the mobile phone 1 has shifted to the stop state.

When the mobile phone 1 has shifted from the walking state to the stop state, it searches for the Wi-Fi base station. When the mobile phone 1 has shifted from the walking state to the stop state, it is highly likely that the user has reached his or her destination. The mobile phone 1 searches for the base station when it has shifted from the walking state to the stop state, so that convenience can be improved.

The stop state is defined as a state where the mobile phone 1 is mounted; however, an embodiment 1 is not limited thereto. For example, the mobile phone 1 may determine that it is in the stop state when a predetermined condition is satisfied and control the communication unit 15 to search for the Wi-Fi base station. The predetermined condition is a state where the user of the mobile phone 1 is substantially stopped, that is, a state where the acceleration value detected by the acceleration sensor 16 is minor (less than a predetermined value).

For example, in a state where the user has the mobile phone 1 by his or her hand, a minor acceleration value may be detected by the acceleration sensor 16 even when the user thinks that the mobile phone 1 is in the stop state. Thus, the controller 18 is made to determine the state where the acceleration value detected by the acceleration sensor 16 is minor as the stop state. With this configuration, even when the user has the mobile phone 1 by his or her hand, the mobile phone 1 determines that it is in the stop state and searches for the base station. Thus, in this mobile phone 1, user convenience can be improved.

When the acceleration value detected by the acceleration sensor 16 is less than a predetermined value for a certain time (e.g., five seconds), that is, when the stop state is maintained for a certain time, the mobile phone 1 may control the communication unit 15 to search for the Wi-Fi base station.

When the stop state of the mobile phone 1 is maintained for a certain time, it is more likely that the user has reached his or her destination than a case where the stop state thereof is not maintained for the certain time. The mobile phone 1 searches for the Wi-Fi base station based on action of the user. Thus, in this mobile phone 1, user convenience can be improved.

The user may set whether or not the controller 18 searches for the Wi-Fi base station when the mobile phone 1 has shifted from the stop state to any one of the moving states.

That is, the storage 17 stores therein the first to fifth moving states and setting information indicating whether or not to search for the Wi-Fi base station in association with each other. The controller 18 may display a setting screen illustrated in FIG. 3 on the display unit 11 so as to receive the setting on whether or not to search for the Wi-Fi base station in each moving state.

Figure 3:
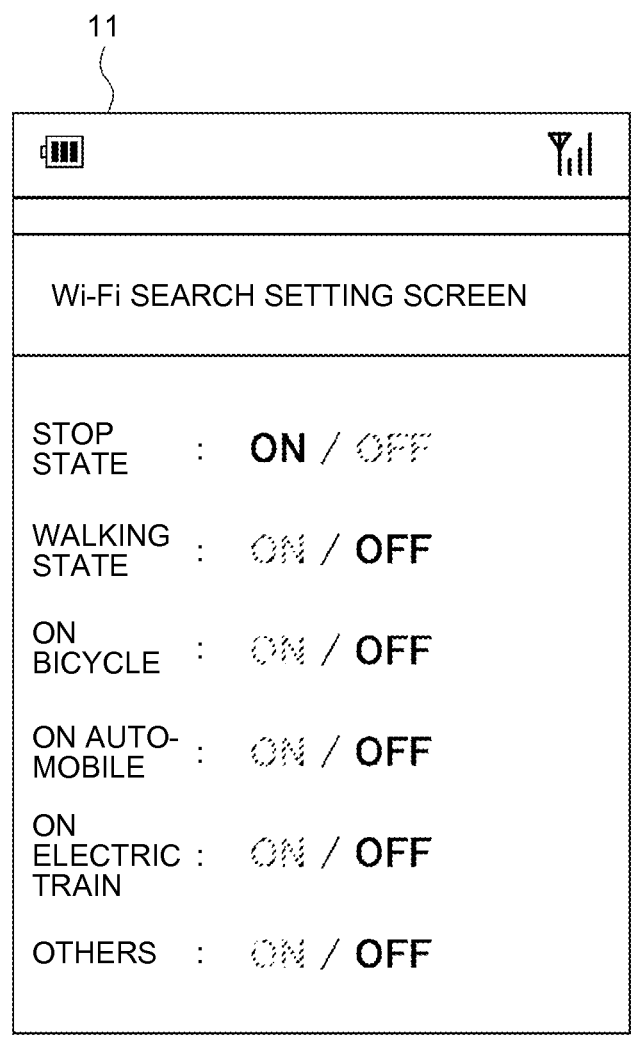
FIG. 3 is a view illustrating an example of a screen for setting whether or not to search for a base station in each state according to an embodiment of some embodiments.

In an example of FIG. 3, when the mobile phone 1 determines that the user is in the stop state, the controller 18 controls the communication unit 15 to search for the Wi-Fi base station. On the other hand, when the mobile phone 1 determines that the user is in any one of moving states (state of moving by walking, state of moving on a bicycle, state of moving on an automobile, state of moving on an electric train, and the like), the controller 18 controls the communication unit 15 not to search for the Wi-Fi base station.

With the above configuration, the mobile phone 1 can search for the Wi-Fi base station when the user is getting on the vehicle, according to a request from the user.

Figure 4:
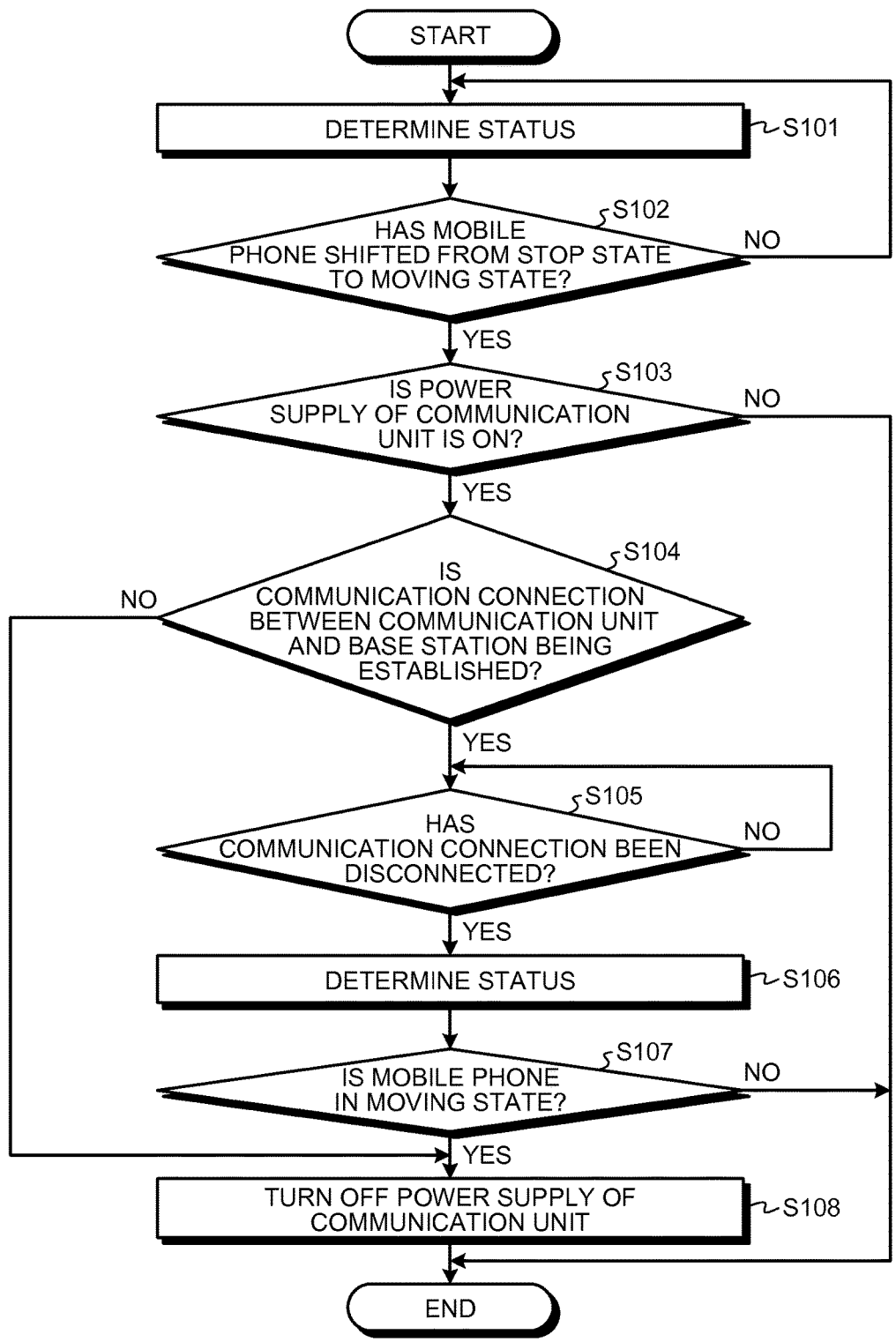
FIG. 4 is a flowchart describing an operation flow of a mobile phone according to an embodiment of some embodiments.

The following describes an operation flow of the mobile phone 1 with reference to a flowchart of FIG. 4. In a following example, it is assumed that the state determination is made in real time. However, an embodiment 1 is not limited thereto, but the mobile phone 1 may make the state determination every predetermined time.

It is assumed that the mobile phone 1 activates a predetermined application through a user operation, starts measuring the acceleration value in response to a measurement start operation, and ends the acceleration value measurement in response to a measurement end operation. However, an embodiment 1 is not limited thereto. For example, the mobile phone 1 may start the acceleration value measurement at a start time designated by a timer and end the measurement at a designated end time. Alternatively, the mobile phone 1 may start the acceleration value measurement after shifting from a power-off state to a power-on state to complete activation thereof. Further, alternatively, the mobile phone 1 may continue the acceleration value measurement until it is powered off. Further, alternatively, the mobile phone 1 may continue the acceleration value measurement while an acceleration value measurement function is on.

In step S101, the controller 18 determines, based on a detection result of the acceleration sensor 16, whether the mobile phone 1 is in the stop state or the moving state. After completion of the processing of step S101, the controller 18 shifts the processing to step S102.

In step S102, the controller 18 determines whether or not the mobile phone 1 has shifted from the stop state to the moving state. When the determination is Yes, the controller 18 shifts the processing to step S103. When the determination is No, the controller 18 shifts the processing to step S101.

In step S103, the controller 18 determines whether or not the power supply of the communication unit 15 is on. When the determination is No, the controller 18 ends this control flow. When the determination is Yes, the controller 18 shifts the processing to step S104.

In step S104, the controller 18 determines whether or not the communication connection between the communication unit 15 and base station is being established. When the determination is Yes, the controller 18 shifts the processing to step S105. When the determination is No, the controller 18 shifts the processing to step S108.

In step S105, the controller 18 determines whether or not the established communication connection has been disconnected. When the determination is Yes, the controller 18 shifts the processing to step S106. When the determination is No, the controller 18 performs step S105 once again.

In step S106, the controller 18 determines, based on the detection result of the acceleration sensor 16, whether the mobile phone 1 is in the stop state or moving state. After completion of the processing of step S106, the controller 18 shifts the processing to step S107.

In step S107, the controller 18 determines whether or not the mobile phone 1 is in the moving state. When the determination is Yes, the controller 18 shifts the processing to step S108. When the determination is No, the controller 18 ends this control flow.

In step S108, the controller 18 turns off the power supply of the communication unit 15. After completion of the processing of step S108, the controller 18 ends this control flow.

As described above, according to an embodiment 1, when it is determined based on the acceleration value detected by the acceleration sensor 16, that the mobile phone 1 has shifted from the stop state to the moving state, the mobile phone 1 controls the power supply of the communication unit 15 to turn off the power supply of the communication unit 15. In the mobile phone 1 of an embodiment 1, when the communication connection between the communication unit 15 and base station is not established, the power supply of the communication unit 15 is turned off. On the other hand, in the mobile phone 1 of an embodiment 1, when the communication connection between the communication unit 15 and base station is being established, the power supply of the communication unit 15 is not turned off, but maintained in the on-state.

Thus, in a case where the mobile phone 1 has shifted to the moving state where it is difficult for the user to perform data communication using the Wi-Fi and where the communication connection between the communication unit 15 and base station is not established, the power supply of the communication unit 15 is turned off. In the mobile phone 1, when the power supply of the communication unit 15 is turned off, the power consumption of the mobile phone 1 can be reduced. When the power supply of the communication unit 15 is turned off, the mobile phone 1 cannot search for the Wi-Fi base station. When the mobile phone 1 is in the moving state, it does not search for the Wi-Fi base station, so that user convenience can be improved.

Even when the mobile phone 1 has shifted to the moving state where it is difficult for the user to perform data communication using the Wi-Fi, the power supply of the communication unit 15 is not turned off, but maintained in the on-state while the communication connection between the communication unit 15 and base station is being established. In the mobile phone 1, when the user performs data communication using the Wi-Fi, the power supply of the communication unit 15 is maintained in the on-state, so that it is possible to suitably control the communication unit 15 for a mobile base station like a mobile router. Thus, in this mobile phone 1, user convenience can be improved.

When the communication connection established between the communication unit 15 and base station is disconnected while the mobile phone 1 is in the moving state, the power supply of the communication unit 15 is turned off. Even in a case where the base station to which the communication unit 15 is being communicably connected when the mobile phone 1 shifts from the stop state to the moving state is a fixed base station, the communication unit 15 can be suitably controlled. Thus, in this mobile phone 1, user convenience can be improved.

When the communication connection established between the communication unit 15 and base station is disconnected while the mobile phone 1 is in the stop state, the power supply of the communication unit 15 is not turned off, but maintained in the on-state. When the mobile phone 1 is in the stop state where the user easily performs data communication using the Wi-Fi, the power supply of the communication unit 15 is maintained in the on-state, so that user convenience can be improved.

(An Embodiment 2)

An Embodiment 2 is one of embodiments. An embodiment 2 will be described. A mobile phone 1 of an embodiment 2 differs from that of the mobile phone 1 of an embodiment 1 in terms of the operation flow, but has the same configuration when viewed as hardware. Thus, in an embodiment 2, descriptions overlapping with an embodiment 1 will be omitted, and mainly the operation flow will be described.

The controller 18 controls a power supply state of the communication unit 15 based on a power supply setting. The power supply setting includes a plurality of power supply modes. The power supply modes of an embodiment 2 include a first power supply mode that maintains the power supply state of the communication unit 15 in the on-state, a second power supply mode that maintains the power supply state of the communication unit 15 in an off-state, and a third power supply mode that controls the power supply state of the communication unit 15 according to an acceleration state determined based on the acceleration value.

The controller 18 can control the power supply state of the communication unit 15 when the acceleration value detected by the acceleration sensor 16 satisfies a predetermined condition. When the communication unit 15 is set in the third power supply mode, the controller 18 controls the power supply state of the communication unit 15 according to the acceleration state. When the controller 18 determines the acceleration state to determine that the mobile phone 1 has shifted from any one of the moving states to the stop state, it controls the power supply state of the communication unit 15 to turn on the power supply. When the power supply state of the communication unit 15 is turned on, the communication unit 15 can search for the base station supporting the Wi-Fi. The mobile phone 1 turns on the power supply state of the communication unit 15 in the stop state, so that power consumption can be reduced as compared to a case where the power supply state of the communication unit 15 is always on.

When the power supply setting of the communication unit 15 is changed from one power supply mode to another, the controller 18 compares the current power supply state and power supply state in the power supply mode after the change and changes the power supply state according to the need. For example, when the power supply setting of the communication unit 15 is changed to the first power supply mode while the current power supply state is the off-state, the controller 18 changes the power supply state to the on-state. On the other hand, when the power supply setting of the communication unit 15 is changed to the first power supply mode while the current power supply state is the on-state, the controller 18 does not change the power supply state. For example, when the power supply setting of the communication unit 15 is changed to the second power supply mode while the current power supply state is the on-state, the controller 18 changes the power supply state to the off-state. On the other hand, when the power supply setting of the communication unit 15 is changed to the second power supply mode while the current power supply state is the off-state, the controller 18 does not change the power supply state. For example, when the power supply setting of the communication unit 15 is changed to the third power supply mode while the current power supply state is the on-state and acceleration state is the moving state, the controller 18 changes the power supply state to the off-state. On the other hand, when the power supply setting of the communication unit 15 is changed to the third power supply mode while the current power supply state is the on-state and acceleration state is the stop state, the controller 18 does not change the power supply state. For example, when the power supply setting of the communication unit 15 is changed to the third power supply mode while the current power supply state is the off-state and acceleration state is the stop state, the controller 18 changes the power supply state to the on-state. On the other hand, when the power supply setting of the communication unit 15 is changed to the third power supply mode current power supply state is the off-state and acceleration state is the moving state, the controller 18 does not change the power supply state.

The controller 18 can temporarily change the power supply state of the communication unit 15 by a user's change operation while maintaining the power supply setting in the third power supply mode. Hereinafter, operation of the mobile phone 1 will be described taking, as an example, operation after the controller 18 determines that the acceleration state has shifted from the stop state to the moving state to change the power supply state of the communication unit 15 from the on-state to off-state. Unless otherwise specified, in the following description of the operation of the mobile phone 1, it is assumed that the power supply setting of the communication unit 15 is maintained in the third power supply mode.

When the power supply state of the communication unit 15 is not changed by the user's change operation, the controller 18 changes the power supply state of the communication unit 15 from the off-state to on-state upon determining that the acceleration state has shifted from the moving state to the stop state.

When the power supply state of the communication unit 15 is changed by the user's change operation, the controller 18 can temporarily change the power supply state of the communication unit 15 to the on-state while maintaining the power supply setting of the communication unit 15 in the third power supply mode even when the acceleration state is the moving state.

When the power supply state of the communication unit 15 is changed once again by the user's change operation during continuation of the moving state, the controller 18 changes the power supply state of the communication unit 15 to the off-state while maintaining the power supply setting of the communication unit 15 in the third power supply mode. Since the power supply state corresponding to the moving state in the third power supply mode and current power supply state coincide with each other, the controller 18 performs the subsequent processing normally. That is, when it is determined that the speed state has shifted from the moving state to the stop state, the controller 18 changes the power supply state of the communication unit 15 from the off-state to on-state.

On the other hand, when it is determined that the acceleration state has shifted from the moving state to the stop state with the power supply state of the communication unit 15 left unchanged by the user's change operation during continuation of the moving state, the controller 18 does not change the power supply state of the communication unit 15, but maintains the power supply state of the communication unit 15 in the on-state. Since the power supply state corresponding to the stop state in the third power supply mode and current power supply state coincide with each other, the controller 18 performs the subsequent processing normally. That is, when it is determined that the speed state has shifted from the stop state to the moving state once again, the controller 18 changes the power supply state of the communication unit 15 from the on-state to off-state. When focusing on the power supply state of the communication unit 15, when the power supply state of the communication unit 15 is changed from the off-state to on-state by the user's change operation while the controller 18 determines that the acceleration state is the moving state, the controller 18 changes the power supply state of the communication unit 15 to the on-state to off-state upon determining that the acceleration state has shifted from the current moving state, through the stop state, to the moving state once again.

Figure 5:
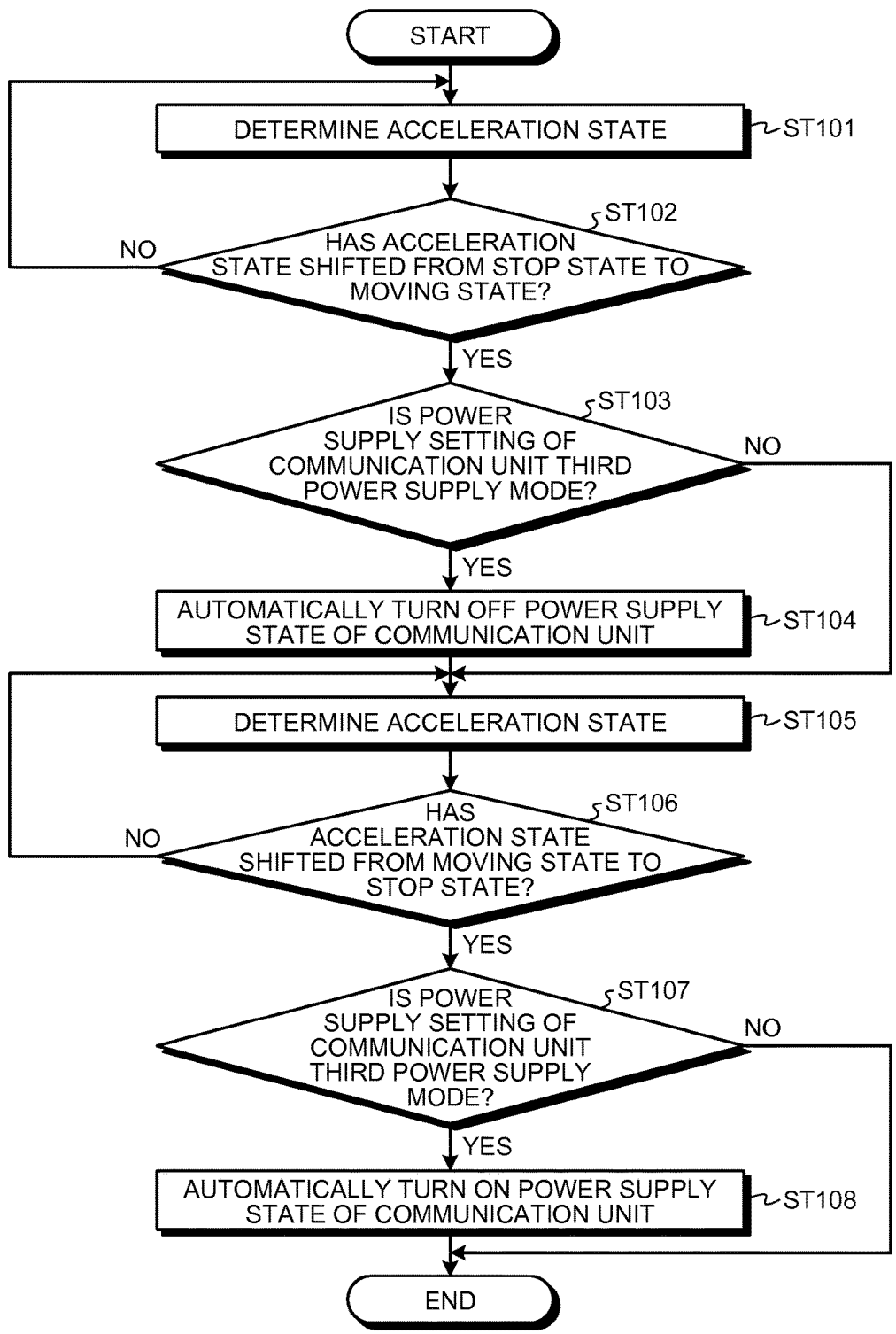
FIG. 5 is a flowchart describing an operation flow of a mobile phone according to an embodiment of some embodiments.

The following describes an operation flow of the mobile phone 1 with reference to a flowchart of FIG. 5. In a following example, it is assumed that the acceleration state is determined in real time. However, an embodiment 2 is not limited thereto, but the mobile phone 1 may determine the acceleration state every predetermined time.

It is assumed that the mobile phone 1 activates a predetermined application through a user operation, starts measuring the acceleration value in response to a measurement start operation, and ends the acceleration value measurement in response to a measurement end operation. However, an embodiment 2 is not limited thereto. For example, the mobile phone 1 may start the acceleration value measurement at a start time designated by a timer and end the measurement at a designated end time. Alternatively, the mobile phone 1 may start the acceleration value measurement after shifting of the power supply state from a power-off state to a power-on state to complete activation thereof. Further, alternatively, the mobile phone 1 may continue the acceleration value measurement until it is powered off. Further, alternatively, the mobile phone 1 may continue the acceleration value measurement while an acceleration value measurement function is on.

In step ST101, the controller 18 determines, based on a detection result of the acceleration sensor 16, the acceleration state, i.e., whether the mobile phone 1 is in the stop state or the moving state. After completion of the processing of step ST101, the controller 18 shifts the processing to step ST102.

In step ST102, the controller 18 determines whether or not the acceleration state of the mobile phone 1 has shifted from the stop state to the moving state. When the determination is Yes, the controller 18 shifts the processing to step ST103. When the determination is No, the controller 18 shifts the processing to step ST101.

In step ST103, the controller 18 determines whether or not the power supply setting of the communication unit 15 is the third power supply mode. When the determination is Yes, the controller 18 shifts the processing to step ST104. When the determination is No, the controller 18 shifts the processing to step ST105.

In step ST104, the controller 18 automatically changes the power supply state of the communication unit 15 to the off-state. This step ST104 is autonomous processing to be performed based on the power supply mode of the communication unit 15. After completion of the processing of step ST104, the controller 18 shifts the processing to step ST105.

In step ST105, the controller 18 determines, based on the detection result of the acceleration sensor 16, the acceleration state, i.e., whether the mobile phone 1 is in the stop state or the moving state. After completion of the processing of step ST105, the controller 18 shifts the processing to step ST106.

In step ST106, the controller 18 determines whether or not the acceleration state has shifted from the moving state to the stop state. When the determination is Yes, the controller 18 shifts the processing to step ST107. When the determination is No, the controller 18 shifts the processing to step ST105.

In step ST107, the controller 18 determines whether or not the power supply setting of the communication unit 15 is the third power supply mode. When the determination is Yes, the controller 18 shifts the processing to step ST108. When the determination is No, the controller 18 ends this control flow.

In step ST108, the controller 18 automatically changes the power supply state of the communication unit 15 to the on-state. This step ST108 is autonomous processing to be performed based on the power supply mode of the communication unit 15. After completion of the processing of step ST108, the controller 18 ends this control flow.

As described above, according to an embodiment 2, when it is determined based on the acceleration value detected by the acceleration sensor 16, that acceleration state of the mobile phone 1 has shifted from the stop state to the moving state, the mobile phone 1 controls the power supply state of the communication unit 15 to turn off the power supply state of the communication unit 15. In the mobile phone 1 of an embodiment 2, when the communication connection between the communication unit 15 and base station is not established, the power supply of the communication unit 15 is turned off. On the other hand, in the mobile phone 1 of an embodiment 2, when the communication connection between the communication unit 15 and base station is being established, the power supply state of the communication unit 15 is not turned off, but maintained in the on-state.

Thus, in a case where the acceleration state of the mobile phone 1 has shifted to the moving state where it is difficult for the user to perform data communication using the Wi-Fi and where the communication connection between the communication unit 15 and base station is not established, the power supply state of the communication unit 15 is turned off. In the mobile phone 1, when the power supply state of the communication unit 15 is turned off, the power consumption of the mobile phone 1 can be reduced. When the power supply of the communication unit 15 is turned off, the mobile phone 1 cannot search for the Wi-Fi base station. When the acceleration state is the moving state, the mobile phone 1 does not search for the Wi-Fi base station, so that user convenience can be improved.

Even when the mobile phone 1 has shifted to the moving state where it is difficult for the user to perform data communication using the Wi-Fi, the power supply state of the communication unit 15 is not turned off, but maintained in the on-state while the communication connection between the communication unit 15 and base station is being established. In the mobile phone 1, when the user performs data communication using the Wi-Fi, the power supply state of the communication unit 15 is maintained in the on-state, so that it is possible to suitably control the communication unit 15 for a mobile base station like a mobile router. Thus, in this mobile phone 1, user convenience can be improved.

When the communication connection established between the communication unit 15 and base station is disconnected while the acceleration state of the mobile phone 1 is the moving state, the power supply state of the communication unit 15 is turned off. Even in a case where the base station to which the communication unit 15 is being communicably connected when the acceleration state of the mobile phone 1 shifts from the stop state to the moving state is a fixed base station, the communication unit 15 can be suitably controlled. Thus, in this mobile phone 1, user convenience can be improved.

When the communication connection established between the communication unit 15 and base station is disconnected while the acceleration state of the mobile phone 1 is the stop state, the power supply of the communication unit 15 is not turned off, but maintained in the on-state. When the acceleration state of the mobile phone 1 is the stop state where the user easily performs data communication using the Wi-Fi, the power supply state of the communication unit 15 is maintained in the on-state, so that user convenience can be improved.

In the mobile phone 1, it is possible to temporarily change the power supply state of the communication unit 15 while maintaining the power supply setting of the communication unit 15 in the third power supply mode, so that user convenience can be improved.

Figure 6:
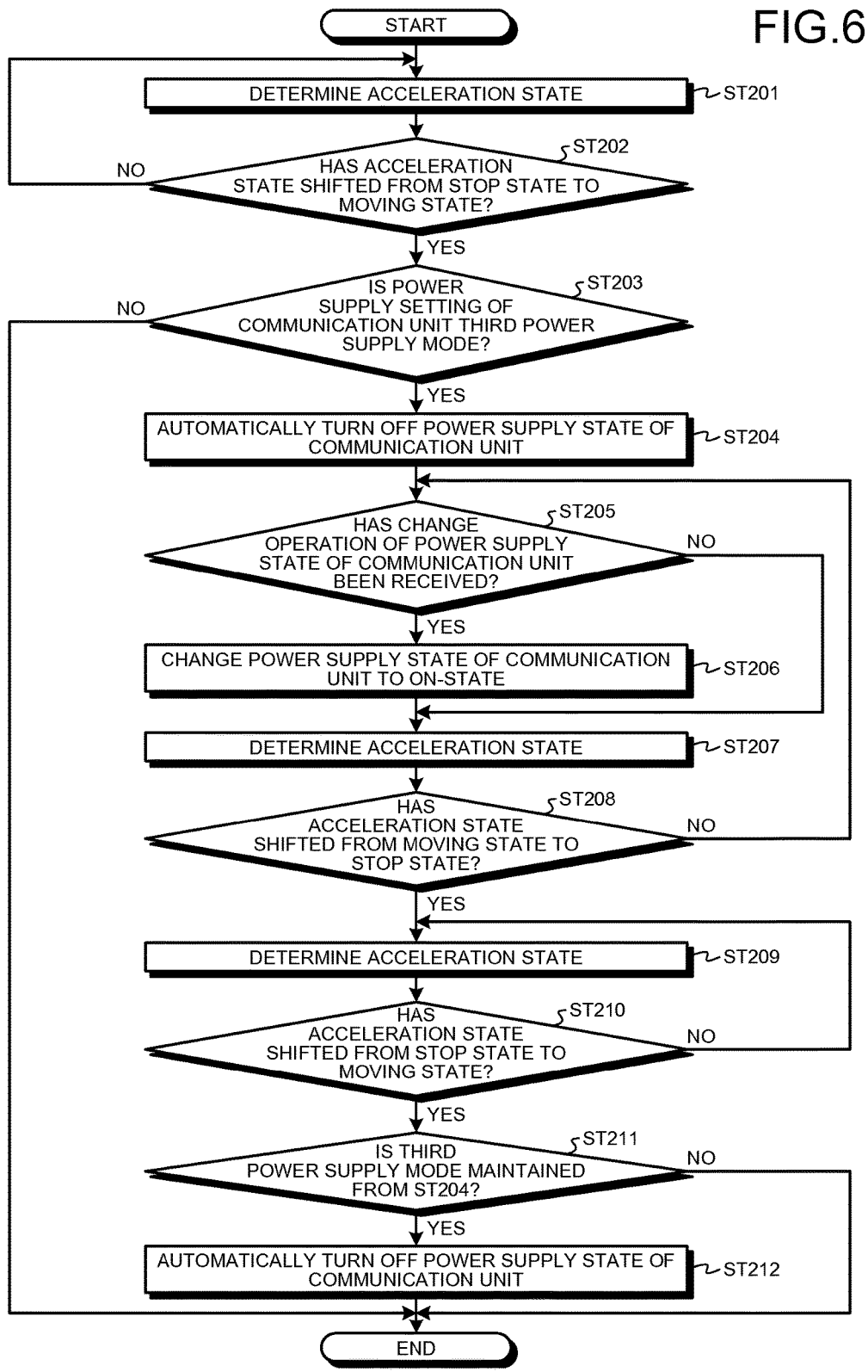
FIG. 6 is a flowchart describing an operation flow of a mobile phone according to an embodiment of some embodiments.

The following describes an operation flow of the mobile phone 1 with reference to a flowchart of FIG. 6. In a following example, it is assumed that the acceleration state is determined in real time. However, an embodiment 2 is not limited thereto, but the mobile phone 1 may determine the acceleration state every predetermined time.

In step ST201, the controller 18 determines, based on a detection result of the acceleration sensor 16, the acceleration state, i.e., whether the mobile phone 1 is in the stop state or the moving state. After completion of the processing of step ST201, the controller 18 shifts the processing to step ST202.

In step ST202, the controller 18 determines whether or not the acceleration state of the mobile phone 1 has shifted from the stop state to the moving state. When the determination is Yes, the controller 18 shifts the processing to step ST203. When the determination is No, the controller 18 shifts the processing to step ST201.

In step ST203, the controller 18 determines whether or not the power supply setting of the communication unit 15 is the third power supply mode. When the determination is Yes, the controller 18 shifts the processing to step ST204. When the determination is No, the controller 18 ends this control flow.

In step ST204, the controller 18 automatically changes the power supply state of the communication unit 15 to the off-state. This step ST204 is autonomous processing to be performed based on the power supply mode of the communication unit 15. After completion of the processing of step ST204, the controller 18 shifts the processing to step ST205.

In step ST205, the controller 18 determines whether or not the operation part 12 has received an operation of changing the power supply state of the communication unit 15. When the determination is Yes, the controller 18 shifts the processing to step ST206. When the determination is No, the controller 18 shifts the processing to step ST207.

In step ST206, the controller 18 changes the power supply state of the communication unit 15 to the on-state. This step ST206 is passive processing to be performed based on the received change operation. After completion of the processing of step ST206, the controller 18 shifts the processing to step ST207.

In step ST207, the controller 18 determines, based on the detection result of the acceleration sensor 16, the acceleration state, i.e., whether the mobile phone 1 is in the stop state or moving state. After completion of the processing of step ST207, the controller 18 shifts the processing to step ST208.

In step ST208, the controller 18 determines whether or not the acceleration state has shifted from the moving state to the stop state. When the determination is Yes, the controller 18 shifts the processing to step ST209. When the determination is No, the controller 18 shifts the processing to step ST205.

In step ST209, the controller 18 determines, based on the detection result of the acceleration sensor 16, the acceleration state, i.e., whether the mobile phone 1 is in the stop state or moving state. After completion of the processing of step ST209, the controller 18 shifts the processing to step ST210.

In step ST210, the controller 18 determines whether or not the acceleration state has shifted from the stop state to the moving state. When the determination is Yes, the controller 18 shifts the processing to step ST211. When the determination is No, the controller 18 shifts the processing to step ST209.

In step ST211, the controller 18 determines whether or not the power supply setting of the communication unit 15 is maintained in the third power supply mode from step ST204. When the determination is Yes, the controller 18 shifts the processing to step ST212. When the determination is No, the controller 18 ends this control flow.

In step ST212, the controller 18 changes the power supply state of the communication unit 15 to the off-state. This step ST212 is passive processing to be performed based on the received change operation. After completion of the processing of step ST212, the controller 18 ends this control flow.

Figure 7:
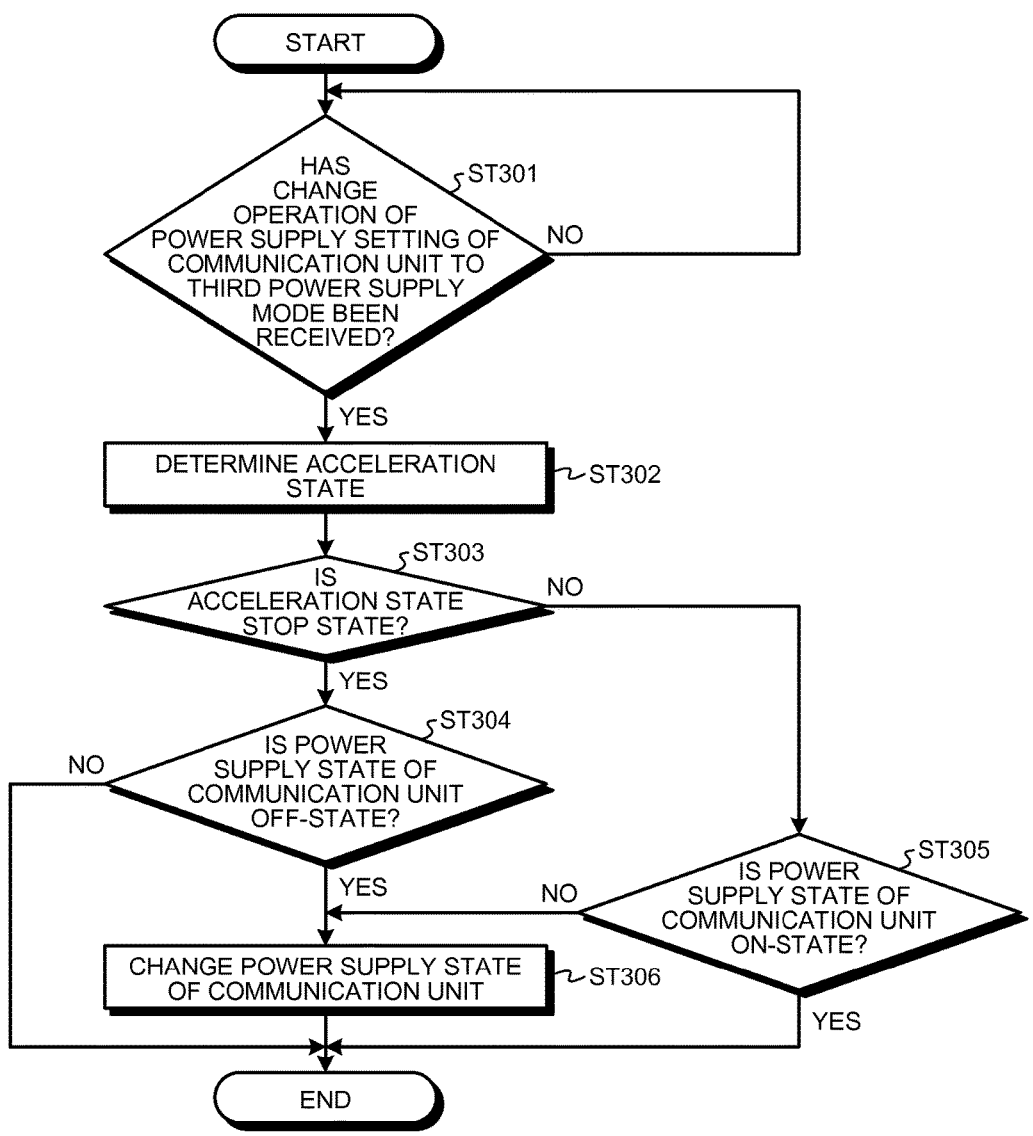
FIG. 7 is a flowchart describing an operation flow of a mobile phone according to an embodiment of some embodiments.

The following describes an operation flow of the mobile phone 1 with reference to a flowchart of FIG. 7. In a following example, it is assumed that the acceleration state is determined in real time. However, an embodiment 2 is not limited thereto, but the mobile phone 1 may determine the acceleration state every predetermined time.

In step ST301, the controller 18 determines whether or not the operation part 12 has received an operation of changing the power supply mode of the communication unit 15 to the third power supply mode. When the determination is Yes, the controller 18 shifts the processing to step ST302. When the determination is No, the controller 18 performs step ST301 once again.

In step ST302, the controller 18 determines, based on a detection result of the acceleration sensor 16, the acceleration state, i.e., whether the mobile phone 1 is in the stop state or moving state. After completion of the processing of step ST302, the controller 18 shifts the processing to step ST303.

In step ST303, the controller 18 determines whether or not the acceleration state is the stop state. When the determination is Yes, the controller 18 shifts the processing to step ST304. When the determination is No, the controller 18 shifts the processing to step ST305.

In step ST304, the controller 18 determines whether or not the power supply state of the communication unit 15 is the off-state. When the determination is Yes, the controller 18 shifts the processing to step ST306. When the determination is No, the controller 18 ends this control flow.

In step ST305, the controller 18 determines whether or not the power supply state of the communication unit 15 is the on-state. When the determination is Yes, the controller 18 ends this control flow. When the determination is No, the controller 18 shifts the processing to step ST306.

In step ST306, the controller 18 changes the power supply state of the communication unit 15. When the current power supply state of the communication unit 15 is the off-state, the controller 18 changes the power supply state to the on-state; when the current power supply state of the communication unit 15 is the on-state, the controller 18 changes the power supply state to the off-state. After completion of the processing of step ST306, the controller 18 ends this control flow.

Although an embodiment of the present disclosure has been described above, the present disclosure is not limited to above embodiments. The effects obtained by the present disclosure are not limited to those described in above embodiments.

In above embodiments, the mobile phone 1 searches for the Wi-Fi base station when it is determined that the acceleration state of the mobile phone 1 has shifted to the stop state; however, the present disclosure is not limited thereto. For example, assuming that the communication unit 15 supports communication using a wireless LAN system, the mobile phone 1 may control the communication unit 15 to search for the wireless LAN system when it is determined, based on the acceleration value detected by the acceleration sensor 16, that the acceleration state has shifted from the moving state to the stop state. The wireless LAN system may be, e.g., a wireless LAN system conforming to IEEE 802.11, Bluetooth (registered trademark), an IrDA, a near field communication (NFC), or the like.

In above embodiments, it is determined, based on the acceleration value detected by the acceleration sensor 16, whether the mobile phone 1 is in the stop state or one of the plurality of moving states; however, the present disclosure is not limited thereto. For example, the following configuration may be adopted, in which the mobile phone 1 uses a global positioning system (GPS) to measure a position of the mobile phone 1 and determines whether the mobile phone 1 is in the stop state or one of the plurality of moving states based on a displacement of the mobile phone 1 per unit time (predetermined time).

The invention claimed is:

1. A mobile device comprising:
an acceleration sensor configured to detect an acceleration value of the mobile device;
a communication unit configured to communicate with a base station; and
a controller configured
to cause a power supply of the communication unit to turn off when a communication connection between the communication unit and the base station is not established upon determining the mobile device has shifted from a stop state to a moving state based on the acceleration value detected by the acceleration sensor, and
not to cause the power supply of the communication unit to turn off when the communication connection between the communication unit and the base station is being established upon determining the mobile device has shifted from the stop state to the moving state based on the acceleration value detected by the acceleration sensor, wherein the controller is configured to
- determine, based on the acceleration value detected by the acceleration sensor, whether the mobile device is in a first moving state where the mobile device moves not faster than a threshold or in a second moving state where the mobile device moves faster than the threshold,
- in response to a determination that the mobile device has shifted from the first moving state to the stop state, cause the communication unit to search for the base station, and
- in response to a determination that the mobile device has shifted from the second moving state to the stop state, cause the communication unit not to search for the base station.

2. The mobile device according to claim 1, wherein the controller is configured to cause the power supply of the communication unit to turn off when the established communication connection between the communication unit and the base station is disconnected while determining that the mobile device is in the moving state.

3. The mobile device according to claim 1, wherein the controller is not configured to cause the power supply of the communication unit to turn off even when the established communication connection between the communication unit and the base station is disconnected after determining that the mobile device has shifted from the moving state to the stop state.

4. A non-transitory storage medium that stores a computer program having computer instructions causing a mobile device having an acceleration sensor and a communication unit to perform:
- detecting, by the acceleration sensor, an acceleration value of the mobile device;
- communicating, by the communication unit, with a base station;
- upon determining, based on the acceleration value detected by the acceleration sensor, that the mobile device has shifted from a stop state to a moving state,
  - turning off a power supply of the communication unit when a communication connection between the communication unit and the base station is not established, and
  - not turning off the power supply of the communication unit when the communication connection between the communication unit and the base station is being established;
- determining, based on the acceleration value detected by the acceleration sensor, whether the mobile device is in a first moving state where the mobile device moves not faster than a threshold or in a second moving state where the mobile device moves faster than the threshold;
- in response to a determination that the mobile device has shifted from the first moving state to the stop state, causing the communication unit to search for the base station; and
- in response to a determination that the mobile device has shifted from the second moving state to the stop state, causing the communication unit not to search for the base station.

5. A method of controlling a mobile device having an acceleration sensor and a communication unit, the method comprising:
- detecting, by the acceleration sensor, an acceleration value of the mobile device;
- communicating, by the communication unit, with a base station;
- upon determining, based on the acceleration value detected by the acceleration sensor, that the mobile device has shifted from a stop state to a moving state,
  - turning off a power supply of the communication unit when a communication connection between the communication unit and the base station is not established, and
  - not turning off the power supply of the communication unit when the communication connection between the communication unit and the base station is being established;
- determining, based on the acceleration value detected by the acceleration sensor, whether the mobile device is in a first moving state where the mobile device moves not faster than a threshold or in a second moving state where the mobile device moves faster than the threshold;
- in response to a determination that the mobile device has shifted from the first moving state to the stop state, causing the communication unit to search for the base station; and
- in response to a determination that the mobile device has shifted from the second moving state to the stop state, causing the communication unit not to search for the base station.

6. The mobile device according to claim 1, wherein the controller is configured to determine, based on the acceleration value detected by the acceleration sensor, that (i) the mobile device moves without a vehicle in the first moving state and that (ii) the mobile device moves with the vehicle in the second moving state.

* * * * *